United States Patent [19]
Park

[11] Patent Number: 5,941,791
[45] Date of Patent: Aug. 24, 1999

[54] POWERTRAIN FOR A FIVE-SPEED AUTOMATIC TRANSMISSION

[75] Inventor: Jongsool Park, Kyunggi-do, Rep. of Korea

[73] Assignee: Hyundai Motor Company, Seoul, Rep. of Korea

[21] Appl. No.: 08/999,238

[22] Filed: Dec. 29, 1997

[30] Foreign Application Priority Data

Oct. 8, 1997 [KR] Rep. of Korea ...................... 97-51604

[51] Int. Cl.[6] ...................................................... F16H 3/62
[52] U.S. Cl. ........................................... 475/284; 475/325
[58] Field of Search ..................................... 475/271, 275, 475/284, 296, 325, 276, 277, 278, 279

[56] References Cited

U.S. PATENT DOCUMENTS 4,395,925  8/1983  Gaus .................................... 475/284 X
5,133,697  7/1992  Hattori ................................ 475/325 X
5,542,889  8/1996  Pierce et al. ............................ 475/275

*Primary Examiner*—Charles A Marmor
*Assistant Examiner*—Sherry Lynn Estremsky
*Attorney, Agent, or Firm*—Finnegan, Henderson, Farabow, Garrett & Dunner, L.L.P.

[57] ABSTRACT

A powertrain for a five-speed automatic transmission includes a first planetary gear unit comprising a first simple planetary gearset having first, second and third operating elements, a second planetary gear unit comprising second, third and fourth simple planetary gearsets having fourth, fifth, sixth, seventh, and eighth operating elements, clutches for selectively connecting the first and second operating elements to the fifth and sixth operating elements, respectively, and brakes for selectively connecting the second and eighth operating elements to a transmission housing so that the second and eighth operating elements can selectively operate as reacting elements. The seventh operating element is connected to the third operating element of the first planetary gear unit, and the fifth and sixth operating elements are connected to the first and second operating elements, respectively.

15 Claims, 4 Drawing Sheets

FIG.6

| Shift Range \ Friction Element | C1 | C2 | B1 | B2 |
|---|---|---|---|---|
| R |  |  | ○ | ○ |
| D1 | ○ |  | ○ |  |
| D2 | ○ |  |  | ○ |
| D3 | ○ | ○ |  |  |
| D4 |  | ○ |  | ○ |
| D5 |  | ○ | ○ |  |

5,941,791

POWERTRAIN FOR A FIVE-SPEED AUTOMATIC TRANSMISSION

FIELD OF THE INVENTION

The present invention relates to a powertrain, and more particularly, to a powertrain for a five-speed automatic transmission used in vehicles, which can be designed to be compact in size and lightweight by reducing the number of frictional elements and planetary gearsets.

DESCRIPTION OF THE RELATED ART

Generally, automatic transmission systems for vehicles comprise a transmission control unit (TCU) which automatically controls shift ratios according to changes in a running condition of the vehicle.

The above-described TCU controls a plurality of friction elements provided in a powertrain to either operative or inoperative states to select one of the three essential elements of the planetary gearset (a sun gear, a ring gear, and a planetary carrier) to be an input element, another a reaction element, and the last an output element, thereby controlling the number of output revolutions.

The powertrain is generally designed to realize four forward speeds and one reverse speed. However, with the development of high-power engines, powertrains have been developed to realize five forward speeds and one reverse speed.

The 5-speed powertrain is comprised of three simple planetary gearsets and at least six friction elements.

However, in such a powertrain for a 5-speed automatic transmission, to drive the vehicle in fourth or fifth speed-overdrive, there is a need for an element which rotates at a higher speed than that of a final output element. This results in power loss. In addition, the large number of friction elements results in a heavy and large-size automatic transmission.

SUMMARY OF THE INVENTION

The present invention has been made in an effort to solve the problems associated with the above described conventional powertrain.

It is an object of the present invention to provide a powertrain for a five-speed automatic transmission used in vehicles which, by omitting an element which rotates at a higher speed than a final output element needed in the prior art during overdrive, can minimize power loss.

It is another object of the present invention to provide a powertrain for a five-speed automatic transmission which can be designed to be compact in size and lightweight by reducing the number of friction elements.

To achieve the above object, the present invention provides a powertrain for a five-speed automatic transmission, comprising:

a first planetary gear unit comprising a first simple planetary gearset having first, second and third operating elements;

a second planetary gear unit comprising second, third and fourth simple planetary gearsets having fourth, fifth, sixth, seventh, and eighth operating elements, said seventh operating element being connected to the third operating element of the first planetary gear unit, and said fifth and sixth operating elements being connected to the first and second operating elements, respectively;

clutch means for selectively connecting said first and second operating elements to the fifth and sixth operating elements, respectively; and brake means for selectively connecting the second and eighth elements to a transmission housing so that the second and eighth elements can selectively operate as reacting elements.

According to one embodiment of the present invention, the first simple planetary gearset is a single pinion planetary gearset having a sun gear fixed on an input shaft as the first operating element, a planet carrier acting as the second operating element, and a ring gear acting as the third operating element. The second simple planetary gearset is a double pinion planetary gearset, the third simple planetary gearset is a single pinion planetary gearset, and the fourth planetary gearset is a double pinion planetary gearset.

The fourth operating element comprises a sun gear of the fourth simple planetary gearset; the fifth operating element comprises a planet carrier of the second simple planetary gearset; the sixth operating element comprises a ring gear of the second simple planetary gearset and a ring gear of the third simple planetary gearset; the seventh operating element comprises a sun gear of the second simple planetary gearset, a planet carrier of the third simple planetary gearset, and a ring gear of the fourth simple planetary gearset; and the eighth operating element comprises a sun gear of the third simple planetary gearset and a planet carrier of the fourth simple planetary gearset.

The sun and ring gears of the second simple planetary gearset are respectively connected to the planet carrier and the ring gear of the third simple planetary gearset. The sun gear and planetary carrier of the third simple planetary gearset are respectively connected to the planet carrier and ring gear of the fourth simple planetary gearset. The sun gear of the fourth simple planetary gearset is connected to a transfer drive gear.

The clutch means comprises a first clutch interposed between the second operating element and the sixth operating element, and a second clutch interposed between the first operating element and the fifth operating element.

The brake means comprises a first brake interposed between the second operating element and the transmission housing, and the second brake interposed between the eighth operating element and the transmission housing.

According to another aspect of the present invention, a five-speed automatic transmission having a powertrain comprises:

a first planetary gear unit comprising a first simple planetary gearset having first, second and third operating elements, said first operating element being connected to an input shaft 10 that the first operating element can act as an input element;

a second planetary gear unit comprising second, third and fourth simple planetary gearsets having fourth, fifth, sixth and seventh operating elements, said fourth operating element acting as an output element, said fifth and sixth operating elements being selectively connected to the first and second operating elements, respectively, and the seventh operating element being connected to the third operating element of the first planetary gear unit;

clutch means for selectively connecting said first and second operating elements to the fifth and sixth operating elements, respectively; and brake means for selectively connecting the second and eighth elements to a transmission housing so that the second and eighth elements can selectively operate as reacting elements.

The first simple planetary gearset is a single pinion planetary gearset having a sun gear fixed on an input shaft as the first operating element, a planet carrier acting as the second operating element, and a ring gear acting as the third operating element.

The second simple planetary gearset is a double pinion planetary gearset, the third simple planetary gearset is a single pinion planetary gearset, and the fourth planetary gearset is a double pinion planetary gearset.

The fourth operating element comprises a sun gear of the fourth simple planetary gearset;

the fifth operating element comprises a planet carrier of the second simple planetary gearset;

the sixth operating element comprises a ring gear of the second simple planetary gearset and a ring gear of the third simple planetary gearset;

the seventh operating element comprises a sun gear of the second simple planetary gearset, a planet carrier of the third simple planetary gearset, and a ring gear of the fourth simple planetary gearset; and the eighth operating element comprises a sun gear of the third simple planetary gearset and a planet carrier of the fourth simple planetary gearset.

The sun and ring gears of the second simple planetary gearset are respectively connected to the planet carrier and the ring gear of the third simple planetary gearset. The sun gear and planetary carrier of the third simple planetary gearset are respectively connected to the planet carrier and ring gear of the fourth simple planetary gearset.

The sun gear of the fourth simple planetary gearset is connected to a transfer drive gear.

The clutch means comprises a first clutch interposed between the second operating element and the sixth operating element, and a second clutch interposed between the first operating element and the fifth operating element.

The brake means comprises a first brake interposed between the second operating element and the transmission housing, and the second brake interposed between the eighth operating element and the transmission housing.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 6 is a chart illustrating the operation of friction elements in each shift range according to a preferred embodiment of the present invention.

DESCRIPTION OF THE PREFERRED EMBODIMENTS

Preferred embodiments of the present invention will now be described in detail with reference to the accompanying drawings.

Figure 1:
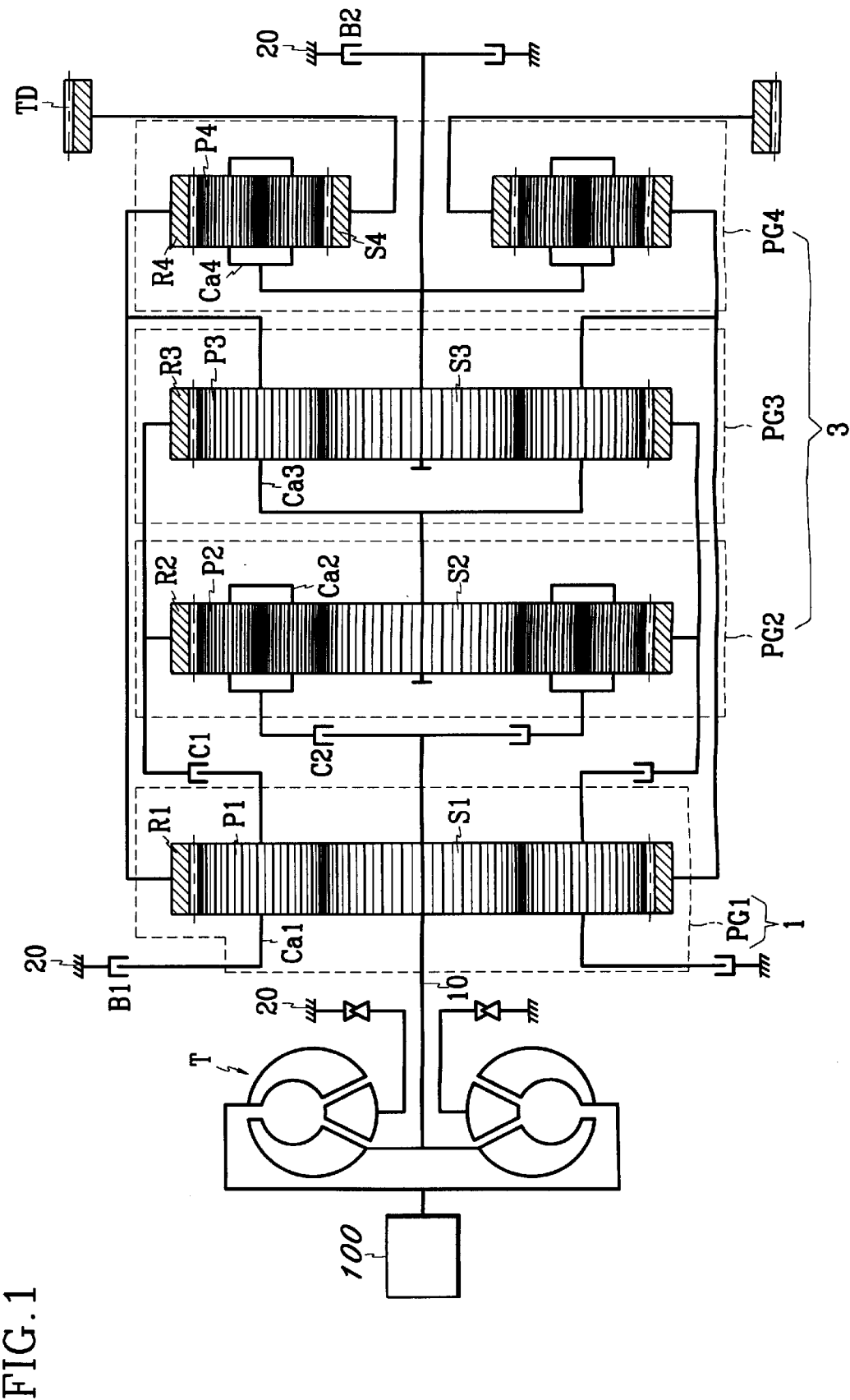
FIG. 1 is a schematic diagram of a powertrain according to a preferred embodiment of the present invention.

Referring first to FIG. 1, the inventive powertrain comprises an engine 100 for generating power, a torque converter T for multiplying torque generated from the engine 100, and first and second planetary gear units 1 and 3 for receiving converted torque through an input shaft 10 and for outputting five forward speeds and one reverse speed to a transfer drive gear TD.

The first planetary gear unit 1 comprises a first simple planetary gearset PG1 that is a single pinion planetary gearset.

The first simple planetary gearset PG1 has three operating elements, i.e., a ring gear R1 acting as an output element, a sun gear S1 fixed around the input shaft 10 to act as an input element, pinion gears P1 engaged between the ring gear R1 and the sun gear S1, and a planet carrier Ca1 connected to a transmission housing 20 to selectively act as a reacting element, the planet carrier Ca1 connecting the pinion gears P1 to each other.

The second planetary gear unit 3 comprises second, third and fourth simple planetary gearsets PG2, PG3 and PG4, the second and fourth planetary gearsets PG2 and PG4 being double planetary gearsets, while the third planetary gearset PG3 being a single planetary gearset.

In the above second, third and fourth simple planetary gearsets PG2, PG3 and PG4, a sun gear S2 of the second simple planetary gearset PG2 is connected to a planet carrier Ca3 connecting pinion gears P3 of the third simple planetary gearset PG3 and to a ring gear R4 of the fourth simple planetary gearset PG4. A ring gear R2 of the second simple planetary gearset PG2 is connected to a ring gear R3 of the third simple planetary gearset PG3. A sun gear S3 of the third simple planetary gearset PG3 is connected to a planet carrier Ca4 for connecting pinion gears P4 to each other and is further connected to the transmission housing 20 to act as a reacting element.

In addition, a sun gear S4 of the fourth simple planetary gearset PG4 is connected to the transfer drive gear TD to act as an output element, and a planetary carrier Ca2 connecting pinion gears P2 of the second simple planetary gearset PG2 is connected to the input shaft 10 to act as an input element.

The ring gear R1 of the first simple planetary gearset PG1 is connected to the sun gear S2, the planet carrier Ca3 and the ring gear R4 of the second, third and fourth simple planetary gearsets PG2, PG3 and PG4, respectively. The planet carrier Ca1 of the first simple planetary gearset PG1 is selectively connected to the ring gears R2 and R3 of the second and third simple planetary gearsets PG2 and PG3, respectively. The sun gear S1 of the first simple planetary gearset PG1 is selectively connected to the input shaft 10 and the planet carrier Ca2 of the second simple planetary gearset PG2. The sun gear S4 of the fourth simple planetary gearset PG4 is connected to the transfer drive gear TD for transmitting rotating power to a final reduction system.

In FIG. 1, a structure for transmitting power from the transfer drive gear TD to a differential through the final reduction system is omitted herewith since the structure is well know in the art.

A first clutch C1 is interposed between the planet carrier Ca1 of the first simple planetary gearset PG1 and the ring gear R2 of the second simple planetary gearset PG2. The first clutch C1 is operated in forward first, second and third speeds to interconnect the planet carrier Ca1 and the ring gear R2. A second clutch C2 is interposed between the sun gear S1 of the first simple planetary gearset PG1 and the planet carrier Ca2 of the second simple planetary gearset PG2. The second clutch C2 is operated in forward third and fourth speeds to connect the sun gear S1 and the planet carrier Ca2 to each other.

In addition, a first brake B1 is interposed between the planet carrier Ca1 of the first simple planetary gearset PG1 and the transmission housing 20. The first brake B1 is engaged to fix the planet carrier Ca1 in forward first and fifth speeds and reverse speed. A second brake B2 is interposed between the sun gear S3 of the third simple planetary gearset PG3, which is connected to the planet carrier Ca4 of the fourth planetary gearset PG4 and the transmission housing 20, such that it can operate in the forward second and fourth speeds and the reverse speed to fix the sun gear S3.

Figure 2:
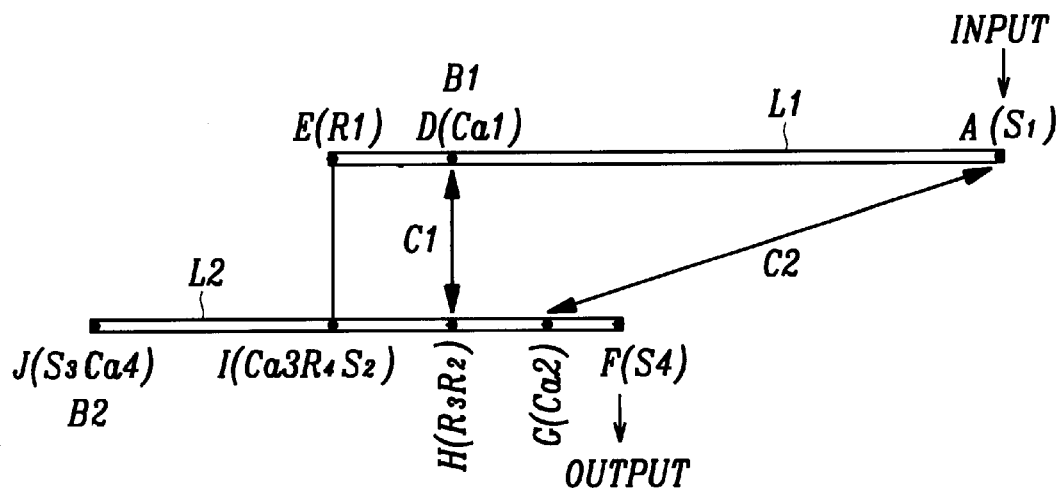
FIG. 2 is a lever analogy illustrating a powertrain according to a preferred embodiment of the present invention.

The above described powertrain can be further described in a lever analogy as shown in FIG. 2. In FIG. 2, levers L1 and L2 indicate the first and second planetary gear units 1 and 3, respectively. The operating elements of the first simple planetary gearset PG1 are indicated as first, second and third operating elements A, D and E of the first lever L1, and the operating elements of the second planetary gear unit 3 are indicated as first, second, third, fourth and fifth operating elements F, G, H, I and J of the second lever L2.

Describing the first lever L1 more in detail, the first operating element A indicates the sun gear S1 of the first simple planetary gearset PG1, the second operating element D indicates the planet carrier Ca1 of the first simple planetary gearset PG1. The third operating element E indicates the ring gear R1 of the first simple planetary gearset PG1.

In addition, in the second lever L2, the first operating element F indicates the sun gear S4 of the fourth simple planetary gearset PG4. The second operating element G indicates the planet carrier Ca2 of the second simple planetary gearset PG2. The third operating element H indicates ring gears R2 and R3 of the second and third simple planetary gearsets PG2 and PG3. The fourth operating element I indicates the sun gear, planet carrier and ring gear S2, Ca3 and R4 of the second, third and fourth simple planetary gearsets PG2, PG3, and PG4. The fifth operating element J indicates the sun gear and planet carrier S3 and Ca4 of the third and fourth simple planetary gearsets PG3 and PG4.

In the first lever L1, the first operating element A is fixed on the input shaft 10 to act as an input element, the second operating element D is variably fixed on the transmission housing by the first brake B1.

In the second lever L2, the first operating element F is fixed to the transfer drive gear TD to act as an output element, and the fifth operating element J is variably fixed on the transmission housing 20 by the second brake B2 to act as a reacting element.

The first and second levers L1 and L2 indicating the first and second planetary gearsets 1 and 3, respectively, are fixedly or variably connected to each other. More in detail, the first and second operating elements A and D of the first lever L1 are variably connected to the second and third operating elements G and H by the second and first clutches C2 and C1, respectively. The third operating element E of the first lever L1 is fixedly connected to the fourth operating element I of the second lever L2.

In the above powertrain of the present invention, the friction elements are operated to realize shifting in the above powertrain of the present invention in accordance with a chart of FIG. 6. The shift process will be explained hereinafter using the chart of FIG. 6 and the lever analogy diagrams of FIGS. 3, 4 and 5.

Figure 3:
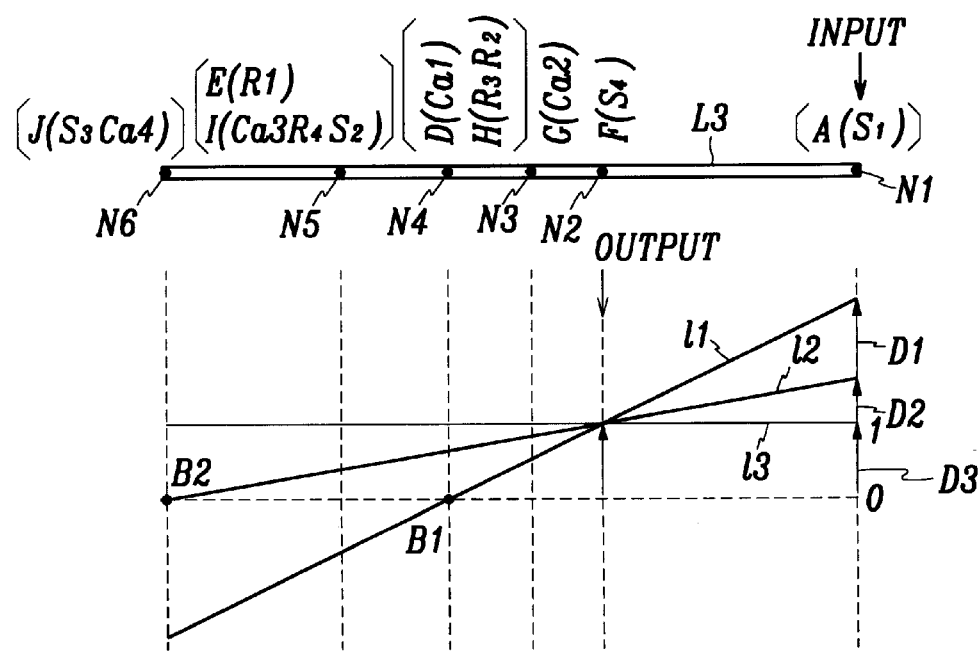
FIG. 3 is a schematic diagram illustrating an operation of forward first, second and third speeds of a powertrain according to a preferred embodiment of the present invention through a lever analogy.

In the forward first, second and third speeds, since the first clutch C i is operated as shown in FIG. 6, the first and second levers L1 and L2 can be illustrated as a single third lever L3 having first through sixth nodes N1, N2, N3, N4, N5 and N6 as shown in FIG. 3.

That is, the first node N1 indicates the first operating element A of the first planetary gear unit 1, the second node N2 indicates the first operating element F of the second planetary gear unit 3, the third node N3 indicates the second operating element G of the second planetary gear unit 3, the fourth node N4 indicates the second operating element D of the first planetary gear unit 1 and the third operating element H of the second planetary gear unit 3, the fifth node N5 indicates the third operating element E of the first planetary gear unit 1 and the fourth operating element I of the second planetary gear unit 3, and the sixth node N6 indicates the fifth operating element J of the second planetary gear unit 3. Through this lever analogy, shift ratios of the forward first, second and third speeds can be demonstrated.

Forward First Speed

In the forward first speed, the first clutch C1 and the first brake B1 are operated. Accordingly, the first node N1 indicating the sun gear S1 of the first simple planetary gearset PG1 becomes the input element, and the fourth node N4 indicating the planet carrier Ca1 of the first simple planetary gearset PG1 and the ring gears R2 and R3 of the second and third planetary gearsets PG2 and PG3 becomes the reacting element. Therefore, the forward first speed is outputted through the transfer drive gear fixed to the second node N2 indicating the sun gear S4 of the fourth simple planetary gearset PG4.

That is, when assuming that the number of output revolution of the sun gear S4 is "1", a line connecting the output point of the second node N2 to the fourth node N4, acting as the reacting element, becomes the first speed line l1. At this point, the number of input revolution D1 of the first node N1 becomes the first input speed which is higher than the output speed "1". This shows that speed reduction is realized.

In the first speed state, the second operating element E of the third node N3 idles in the output direction, while the third, fourth and fifth operating elements E, I and J of the fifth and sixth nodes N5 and N6 rotate in the opposite direction of the output.

Forward Second Speed

If throttle opening is increased in the forward first speed state, the first brake B1 is disengaged, while the second brake B2 is operated. Accordingly, the reacting element is changed from the fourth node N4 to the sixth node N6 indicating the sun gear S3 of the third planetary gearset PG3 and the planet carrier Ca5 of the fourth simple planetary gearset PG4. Therefore, the forward second speed is outputted through the transfer drive gear TD fixed to the second node N2 indicating the sun gear S4 of the fourth simple planetary gearset PG4.

That is, when assuming that the number of output revolution of the sun gear S4, i.e., the node N4, is "1", a line connecting the output speed point of the second node N2 to the sixth node N6, acting as the reacting element, becomes the second speed line l2. At this point, the number of input revolution of the first node N1 becomes the second input speed which is higher than the output speed "1". This shows that speed reduction is realized.

In this forward second speed state, all operating elements of the third, fourth and fifth nodes N3, N4 and N5 rotate in the output direction at the number of revolutions less than that of the output.

Forward Third Speed

If the throttle opening is increased in the forward second speed state, the second brake B2 is released, while the second clutch C2 is operated. Accordingly, since the first and second planetary gearsets 1 and 3 are locked as the output is realized through the first node N1, the forward third speed is outputted through the transfer drive gear TD, fixed to the second node N2 indicating the sun gear S4 of the fourth simple planetary gearset PG4, at the same number of revolution as that of the input.

That is, when assuming that the number of output revolution of the sun gear S4 is "1", a line connecting the output speed point of the second node N2 to the equal level of the first node N1, acting as the input element, becomes the third speed line 13. At this point, the number of input revolution of the first node N1 becomes the third input speed D3 which is equal to that of the output speed "1". This shows that neither speed reduction nor speed increase occurs.

In this forward third speed state, all operating elements of the nodes N1 through N6 rotate in the output direction at the same number of revolution as that of the output.

Forward Fourth and Fifth Speeds

Figure 4:
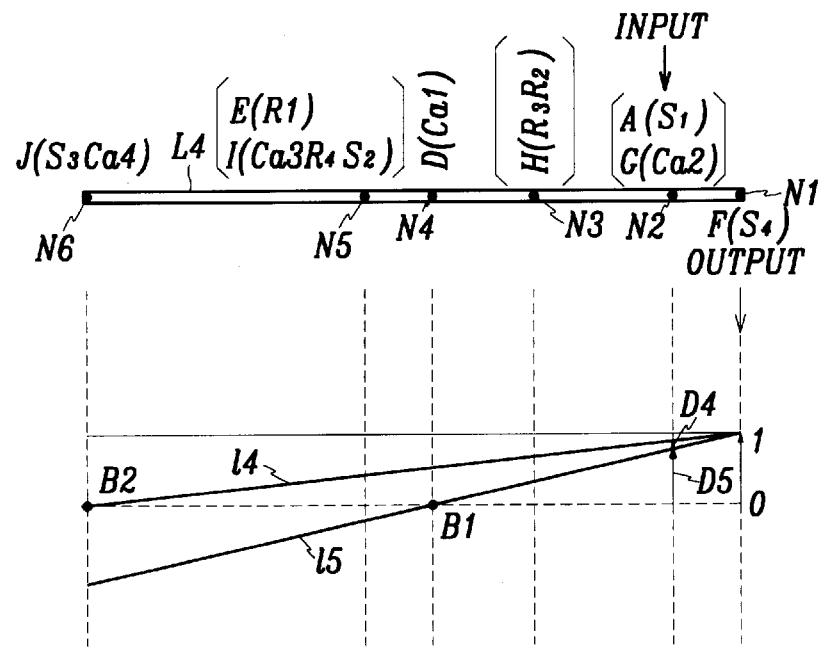
FIG. 4 is a schematic diagram illustrating an operation of forward fourth and fifth speeds of a powertrain according to a preferred embodiment of the present invention through a lever analogy.

In the forward fourth and fifth speeds, since the second clutch C2 is operated as shown in FIG. 6, the first and second levers L1 and L2 can be illustrated as a single fourth lever L4 having first through sixth nodes N1, N2, N3, N4, N5 and N6 as shown in FIG. 4.

That is, in the fourth lever L4, the first node N1 indicates the first operating element F of the second planetary gear unit 3, the second node N2 indicates the first operating element A of the first planetary gear unit 1 and the second operating element G of the second planetary gear unit 3, the third node N3 indicates the third operating element H of the second planetary gearset 2, the fourth node N4 indicates the second operating element D of the first planetary gear unit 1, the fifth node N5 indicates the third operating element E of the first planetary gear unit I and the fourth operating element of the second planetary gear unit 3, and the sixth node N6 denotes the fifth operating element J of the second planetary gear unit 3. Through this lever analogy, shift ratios of the forward fourth and fifth speeds can be analogized.

Forward Fourth Speed

If the throttle opening is increased in the third speed state, the first clutch C1 is disengaged, while the second brake B2 is operated. Accordingly, the second node N2 indicating the sun gear S2 and planet carrier Ca2 of the first and second planetary gearsets PG1 and PG2, respectively, becomes the input element, while the sixth node N6 indicating the sun gear S3 and the planet carrier Ca4 of the third and fourth planetary gearsets PG3 and PG4, respectively, becomes the reacting element.

Therefore, the forward fourth speed is outputted through the transfer drive gear TD fixed to the first node N1 indicating the sun gear S4 of the fourth simple planetary gearset PG4.

That is, when assuming that the number of output revolution of the sun gear S4, i.e., the node N1, is "1", a line connecting the output speed point of the first node N1 to the sixth node N6, acting as the reacting element, becomes a fourth speed line 14. At this point, the number of input revolution D4 of the second node N2 becomes the fourth input speed which is less than the output speed "1". This shows that speed increase is realized. That is, the fourth speed state is an overdrive in which output speed is higher than the input speed.

In the fourth speed state, all the operating elements of the third, fourth and fifth nodes N3, N4 and N5 rotate in the output direction at the number of revolutions less than that of the output. Therefore, since there is no operating element which idles at the number of revolutions higher than that of output, power loss is prevented.

Forward Fifth Speed

If the throttle opening is increased in the fourth speed state, the second brake B2 is disengaged, while the first brake B2 is operated. Accordingly, the second node N2 indicating the sun gear S2 and planet carrier Ca2 of the first and second planetary gearsets PG1 and PG2, respectively, becomes the input element, while the fourth node N4 indicating the planet carrier Ca1 of the first simple planetary gearset PG1 becomes the reacting element.

Therefore, the forward fifth speed is outputted through the transfer drive gear TD fixed to the first node N1 indicating the sun gear S4 of the fourth simple planetary gearset PG4.

That is, when assuming that the number of output revolution of the sun gear S4, i.e., the node N1, is "1", a line connecting the output speed point of the first node N1 to the fourth node N4, acting as the reacting element, becomes a fifth speed line 15. At this point, the number of input revolution D5 of the second node N2 becomes the fifth input speed which is less than the output speed "1". This shows that speed increase is realized. That is, the fifth speed state is an overdrive state in which the output speed is higher than the input speed.

In the fifth speed state, the operating element of the third node N3 rotates in the output direction at the number of revolutions less than that of the output, while the operating elements of the fifth and sixth nodes N5 and N6 rotate in the opposition direction of the output direction. Therefore, since there is no operating element which idles at the number of revolutions higher than that of output, power loss is prevented.

Reverse Speed

When a shift mode is selected to a reverse mode, the first and second clutches C1 and C2 are disengaged, and the first and second brakes B1 and B2 are operated.

Figure 5:
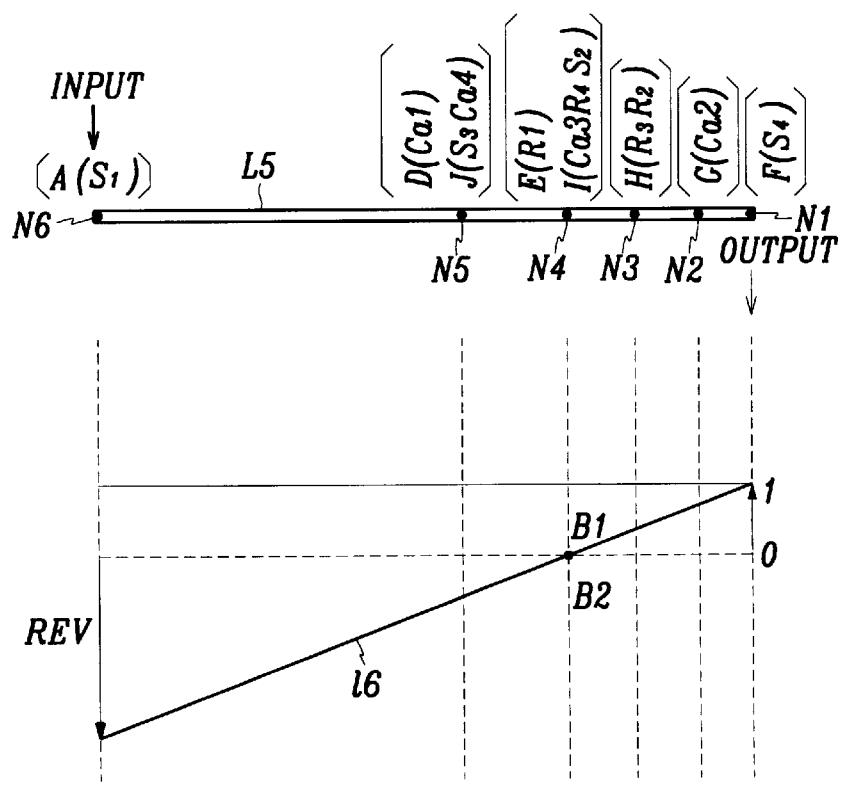
FIG. 5 is a schematic diagram illustrating an operation of reverse speed of a powertrain according to a preferred embodiment of the present invention through a lever analogy.

Accordingly, in the reverse mode, the first and second levers L1 and L2 can be illustrated as a single lever L5 having first through sixth nodes N1 through N6 as shown in FIG. 5.

That is, in the fifth lever L5, the first node N1 indicates the first operating element F of the second planetary gear unit 3, the second node N2 indicates the second operating element G of the second planetary gear unit 3, the third node N3 indicates the third operating element H of the second planetary gear unit 3, the fourth node N4 indicates the third operating element E of the first planetary gear unit 1 and the fourth operating element J of the second planetary gear unit 3, the fifth node N5 denotes the second operating element D of the first planetary gear unit 1 and the fifth operating element J of the second planetary gear unit 3, and the sixth node N6 indicates the first operating element A of the first planetary gear unit 1. Through this lever analogy, the reverse speed can be demonstrated.

In the reverse mode, the first and second clutches C1 and C2 are disengaged, while the first and second brakes B1 and B2 are operated. Accordingly, the sixth node N6 indicating the first operating element A of the first planetary gear unit 1 becomes the input element, while the fifth node N5 indicating the second operating element D of the first planetary gear unit 1 and the fifth operating element J of the second planetary gear unit 3 becomes the reacting element.

Therefore, the reverse speed is outputted through the transfer drive gear TD fixed to the first node N1 indicating the sun gear S4 of the fourth simple planetary gearset PG4.

That is, when assuming that the number of output revolution of the sun gear S4, i.e., the node N1, is "1", a line connecting the output speed point of the first node N1 to the fifth node NS, acting as the reacting element, becomes the reverse speed line 16. At this point, the number of input revolution REV of the sixth node N6 becomes the reverse input speed. That is, the direction of the input speed is opposite to the output speed.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A powertrain for a five-speed automatic transmission, comprising:

a first planetary gear unit comprising a first simple planetary gearset having first, second and third operating elements, wherein the first simple planetary gearset is a single pinion planetary gearset having a sun gear fixed on an input shaft as the first operating element, a planet carrier acting as the second operating element, and a ring gear acting as the third operating element;

a second planetary gear unit comprising second, third and fourth simple planetary gearsets having fourth, fifth, sixth, seventh, and eighth operating elements, said seventh operating element being connected to the third operating element of the first planetary gear unit, and said fifth and sixth operating elements being selectively connected to the first and second operating elements, respectively;

clutch means for selectively connecting said first and second operating elements to the fifth and sixth operating elements, respectively; and brake means for selectively connecting the second and eighth operating elements to a transmission housing so that the second and eighth operating elements can selectively operate as reacting elements.

2. The powertrain of claim 1, wherein the second simple planetary gearset is a double pinion planetary gearset, the third simple planetary gearset is a single pinion planetary gearset, and the fourth planetary gearset is a double pinion planetary gearset.

3. The powertrain of claim 1, wherein the brake means comprises a first brake interposed between the second operating element and the transmission housing, and the second brake interposed between the eighth operating element and the transmission housing.

4. The powertrain of claim 1, wherein the fourth operating element comprises a sun gear of the fourth simple planetary gearset;

the fifth operating element comprises a planet carrier of the second simple planetary gearset;

the sixth operating element comprises a ring gear of the second simple planetary gearset and a ring gear of the third simple planetary gearset;

the seventh operating element comprises a sun gear of the second simple planetary gearset, a planet carrier of the third simple planetary gearset, and a ring gear of the fourth simple planetary gearset; and the eighth operating element comprises a sun gear of the third simple planetary gearset and a planet carrier of the fourth simple planetary gearset.

5. The powertrain of claim 4, wherein the sun and ring gears of the second simple planetary gearset are respectively directly connected to the planet carrier and the ring gear of the third simple planetary gearset; and the sun gear and planetary carrier of the third simple planetary gearset are respectively directly connected to the planet carrier and ring gear of the fourth simple planetary gearset.

6. The powertrain of claim 4, wherein the sun gear of the fourth simple planetary gearset is connected to a transfer drive gear.

7. The powertrain of claim 4, wherein the clutch means comprises a first clutch interposed between the second operating element and the sixth operating element, and a second clutch interposed between the first operating element and the fifth operating element.

8. A five-speed automatic transmission having a powertrain comprising:

a first planetary gear unit comprising a first simple planetary gearset having first, second and third operating elements, said first operating element being connected to an input shaft so that the first operating element can act as an input element;

a second planetary gear unit comprising second, third and fourth simple planetary gearsets having fourth, fifth, sixth, seventh, and eighth operating elements, said fourth operating element acting as an output element, said fifth and sixth operating elements being selectively connected to the first and second operating elements, respectively, and the seventh operating element being connected to the third operating element of the first planetary gear unit;

clutch means for selectively connecting said first and second operating elements to the fifth and sixth operating elements, respectively; and brake means for selectively connecting the second and eighth elements to a transmission housing so that the second and eighth elements can selectively operate as reacting elements.

9. The five-speed automatic transmission of claim 8, wherein the first simple planetary gearset is a single pinion planetary gearset having a sun gear fixed on an input shaft as the first operating element, a planet carrier acting as the second operating element, and a ring gear acting as the third operating element.

10. The five-speed automatic transmission of claim 8, wherein the second simple planetary gearset is a double pinion planetary gearset, the third simple planetary gearset is a single pinion planetary gearset, and the fourth planetary gearset is a double pinion planetary gearset.

11. The five-speed automatic transmission of claim 8, wherein the brake means comprises a first brake interposed between the second operating element and the transmission housing, and the second brake interposed between the eighth operating element and the transmission housing.

12. The five-speed automatic transmission of claim 8, wherein the fourth operating element comprises a sun gear of the fourth simple planetary gearset;

the fifth operating element comprises a planet carrier of the second simple planetary gearset;

the sixth operating element comprises a ring gear of the second simple planetary gearset and a ring gear of the third simple planetary gearset;

the seventh operating element comprises a sun gear of the second simple planetary gearset, a planet carrier of the third simple planetary gearset, and a ring gear of the fourth simple planetary gearset; and the eighth operating element comprises a sun gear of the third simple planetary gearset and a planet carrier of the fourth simple planetary gearset.

13. The five-speed automatic transmission of claim 12, wherein the sun and ring gears of the second simple planetary gearset are respectively directly connected to the planet carrier and the ring gear of the third simple planetary gearset; and the sun gear and planetary carrier of the third simple planetary gearset are respectively directly connected to the planet carrier and ring gear of the fourth simple planetary gearset.

14. The five-speed automatic transmission of claim 12, wherein the sun gear of the fourth simple planetary gearset is connected to a transfer drive gear.

15. The five-speed automatic transmission claim 12, wherein the clutch means comprises a first clutch interposed between the second operating element and the sixth operating element, and a second clutch interposed between the first operating element and the fifth operating element.

* * * * *